(12) United States Patent
Mochizuki

(10) Patent No.: US 10,232,547 B2
(45) Date of Patent: *Mar. 19, 2019

(54) COMPOSITE MOLDED ARTICLE AND METHOD FOR MANUFACTURING SAME

(71) Applicant: Polyplastics Co., Ltd., Tokyo (JP)

(72) Inventor: Akihiro Mochizuki, Fuji (JP)

(73) Assignee: POLYPLASTICS CO., LTD., Tokyo (JP)

(*) Notice: Subject to any disclaimer, the term of this patent is extended or adjusted under 35 U.S.C. 154(b) by 333 days.

This patent is subject to a terminal disclaimer.

(21) Appl. No.: 15/124,440

(22) PCT Filed: Mar. 19, 2015

(86) PCT No.: PCT/JP2015/058203
§ 371 (c)(1),
(2) Date: Sep. 8, 2016

(87) PCT Pub. No.: WO2015/146767
PCT Pub. Date: Oct. 1, 2015

(65) Prior Publication Data
US 2017/0015047 A1    Jan. 19, 2017

(30) Foreign Application Priority Data

Mar. 25, 2014 (JP) ................. 2014-062270

(51) Int. Cl.
*B29C 45/14* (2006.01)
*B29C 59/16* (2006.01)
(Continued)

(52) U.S. Cl.
CPC .............. *B29C 59/16* (2013.01); *B23K 20/10* (2013.01); *B23K 26/21* (2015.10); *B23K 26/364* (2015.10);
(Continued)

(58) Field of Classification Search
CPC . B29C 45/14336; B29C 59/16; B29C 59/005; B29C 66/0246; B29C 66/30325; B29K 26/364
See application file for complete search history.

(56) References Cited

U.S. PATENT DOCUMENTS 3,431,157 A * 3/1969 Mack ................. B29C 37/0082
156/182
4,636,609 A * 1/1987 Nakamata ........... B29C 37/0082
219/121.64
(Continued)

FOREIGN PATENT DOCUMENTS

CN    104995011 A    10/2015
DE    3903153 A1    8/1990
(Continued)

OTHER PUBLICATIONS

Notice of Reasons for Rejection issued to JP Application No. 2015-544257, dated Nov. 10, 2015.
(Continued)

*Primary Examiner* — Robert B Davis
(74) *Attorney, Agent, or Firm* — Knobbe Martens Olson & Bear LLP

(57) ABSTRACT

A composite molded article in which another material is integrated on a face having grooves in a grooved resin molded article having grooves in which end parts of a fibrous inorganic filler protrude and are exposed from lateral faces of the grooves on a surface side in at least the insides of the grooves. Exposure of the end parts of the fibrous inorganic filler and formation of the grooves may be accomplished by laser irradiation, and the depth of the grooves may be at least 200 μm. Another molded article comprising the other material is arranged surrounding the fibrous inorganic filler in the insides of the grooves.

5 Claims, 4 Drawing Sheets

(51) Int. Cl.

| | | |
|---|---|---|
| *B23K 26/364* | (2014.01) | |
| *B23K 20/10* | (2006.01) | |
| *B23K 26/21* | (2014.01) | |
| *B29C 65/00* | (2006.01) | |
| *B29C 65/02* | (2006.01) | |
| *B29C 37/00* | (2006.01) | |
| *B29C 65/82* | (2006.01) | |
| *B29C 59/00* | (2006.01) | |
| *B29C 65/08* | (2006.01) | |
| *B29C 65/16* | (2006.01) | |
| *B29K 509/08* | (2006.01) | |
| *B23K 103/16* | (2006.01) | |
| *B23K 103/00* | (2006.01) | |

(52) U.S. Cl.
CPC .... *B29C 37/0082* (2013.01); *B29C 45/14336* (2013.01); *B29C 59/005* (2013.01); *B29C 65/02* (2013.01); *B29C 65/8253* (2013.01); *B29C 66/0246* (2013.01); *B29C 66/1142* (2013.01); *B29C 66/3034* (2013.01); *B29C 66/30325* (2013.01); *B29C 66/5261* (2013.01); *B29C 66/72143* (2013.01); *B23K 2103/16* (2018.08); *B23K 2103/42* (2018.08); *B23K 2103/50* (2018.08); *B29C 65/08* (2013.01); *B29C 65/16* (2013.01); *B29C 66/71* (2013.01); *B29C 66/7392* (2013.01); *B29C 66/7394* (2013.01); *B29C 66/73921* (2013.01); *B29C 2791/009* (2013.01); *B29K 2509/08* (2013.01)

(56) References Cited

U.S. PATENT DOCUMENTS

| | | | |
|---|---|---|---|
| 5,594,827 | A | 1/1997 | Joulie et al. |
| 7,393,577 | B2 | 7/2008 | Day et al. |
| 7,694,479 | B2 | 4/2010 | Killen |
| 9,610,713 | B2 * | 4/2017 | Mochizuki ............. B29C 65/08 |
| 2007/0075050 | A1 | 4/2007 | Heyl |
| 2009/0010603 | A1 | 1/2009 | Sugioka et al. |
| 2011/0081514 | A1 | 4/2011 | Day et al. |
| 2011/0177286 | A1 | 7/2011 | Maier et al. |
| 2015/0367538 | A1 | 12/2015 | Mochizuki |

FOREIGN PATENT DOCUMENTS

| | | | |
|---|---|---|---|
| DE | 19523900 C1 | 1/1997 | |
| DE | 10102853 B4 | 2/2005 | |
| DE | 102004039132 A1 | 3/2006 | |
| DE | 112014000775 T5 | 10/2015 | |
| JP | H01-126339 | 5/1989 | |
| JP | H03-203291 | 9/1991 | |
| JP | H09-052252 | 2/1997 | |
| JP | H09-314669 | 12/1997 | |
| JP | 2000-351189 | 12/2000 | |
| JP | 2002-011795 | 1/2002 | |
| JP | 2010-247206 | 11/2010 | |
| JP | 2011-079289 | 4/2011 | |
| JP | 2011-529404 | 12/2011 | |
| JP | 2012255513 A * | 12/2012 | ............. B29C 65/48 |
| JP | 2014-018995 | 2/2014 | |
| WO | WO 2014/125999 | 8/2014 | |
| WO | WO 2015/033728 | 3/2015 | |

OTHER PUBLICATIONS

Office Action in German Patent Application No. 112015001385.7, dated Dec. 12, 2016.

Office Action in Chinese Patent Application No. 201580011209.0, dated Jan. 12, 2017.

Jaeschke, et al., Laser transmission welding of high-performance polymers and reinforced composites—a fundamental study. In: Journal of Reinforced Plastics and Composites, vol. 29, 2010, No. 20, S. 3083-3094—ISSN 0731-6844.

Office Action issued in German Patent Application No. 112015001385.7, dated Jun. 19, 2017.

Office Action issued in German Patent Application No. 11 2014 000775.7, dated Sep. 23, 2015.

Notice of References Cited issued in U.S. Appl. No. 14/766,835 dated Mar. 23, 2016.

Notice of References Cited issued in U.S. Appl. No. 14/766,835 dated Jul. 8, 2016.

Notice of References Cited issued in U.S. Appl. No. 14/766,835 dated Sep. 29, 2016.

* cited by examiner

SCHEMATIC ILLUSTRATION FOR OBTAINING THE COMPOSITE MOLDED ARTICLE 1 BY MULTIPLE MOLDING (1) PRIMARY MOLDING OF A PRIMARY RESIN (2) FORMATION OF THE GROOVE 12 ON THE SURFACE (3) SECONDARY MOLDING BY ADDING A SECONDARY RESIN AFTER PLACING THE GROOVED RESIN MOLDED ARTICLE 10 INTO A MOLD (NOT SHOWN)

(1)

PERPENDICULAR TO THE SURFACE OF AN INJECTION-MOLDED ARTICLE (2)

60 DEGREES TO THE SURFACE OF AN INJECTION-MOLDED ARTICLE

SEM IMAGES OF THE GROOVED RESIN MOLDED ARTICLES ACCORDING TO EXAMPLE 1 (COMPARISON OF IRRADIATION ANGLES OF LASER)

SEM IMAGES OF THE GROOVED RESIN MOLDED ARTICLES
ACCORDING TO EXAMPLE 2 (COMPARISON OF RESIN MATERIALS)

MAGNIFICATION: 300 TIMES

REFERENCE EXAMPLE 2
CB 0.2%

REFERENCE EXAMPLE 2
CB 0.01%

REFERENCE EXAMPLE 3
CB 0.01%

COMPOSITE MOLDED ARTICLE AND METHOD FOR MANUFACTURING SAME

This application is the U.S. National Phase under 35 U.S.C. § 371 of International Application PCT/JP2015/058203, filed Mar. 19, 2015, designating the U.S., and published in Japanese as WO 2015/146767 on Oct. 1, 2015, which claims priority to Japanese Patent Application No. 2014-062270, filed Mar. 25, 2014, the entire contents of which are incorporated herein by reference.

TECHNICAL FIELD

The present invention relates to a composite molded article and a manufacturing method thereof.

BACKGROUND ART

In recent years, in the fields of automobiles, electronic products, industrial equipment and the like, there is an increasing trend of replacing a portion of a metal molded article with a resin molded article in order to respond to the demands of reducing carbon dioxide emission, manufacturing costs and the like. In connection with this, composite molded articles are widely used in which resin molded articles are integrated with metal molded articles. Without being limited to this, composite molded articles in which molded articles of similar or dissimilar materials are integrated together are also widely used.

As a method of manufacturing a composite molded article in which one molded article is integrated with another molded article, the following have been proposed, for example. Patent Document 1 proposes a method comprising: mixing a filler such as glass fiber with one resin to perform molding; subjecting the other resin to chemical, plasma, flame treatments and the like to remove a resin with a thickness of several tenths of micrometers to several tens of micrometers; and then while the other resin is allowed to make contact with a surface for adhering the other resin, filling and molding are performed, thereby achieving adhesion. Further, Patent Document 2 proposes a method comprising: irradiating a surface of one resin molded article with electromagnetic radiation to form a nano structure in the above surface; and then filling and molding are performed while the other resin molded article is allowed to make contact with the above surface, thereby achieving integration.

Further, Patent Document 3 proposes a method comprising: press-bonding a base material with a surface layer material, the base material having a shape of pits and protrusions in which hard fibers protrude from a surface thereof. Patent Document 4 proposes a method comprising: bonding molding materials together at their joining regions, the molding materials having metal fibers exposed on the surfaces thereof. Patent Document 5 proposes a method comprising: packing a filler metal into a joining region between a composite material and a layered composite materials such as an FRP material and FRM (fiber reinforced metal) or between a composite material and a butt weld joint, a lap weld joint, an edge weld joint or a fillet weld joint of a joint comprising a different metal material, the filler metal comprising a low percentage to 80% by weight of a reinforcement material, the reinforcement material comprising a reinforcement fiber, a tempered glass, a whisker in a thermoplastic resin, a thermosetting resin and a mixture of a thermoplastic resin and a thermosetting resin; and laser-welding the composite material and the layered composite material while performing the packing using a high-power continuous oscillation solid-state laser.

Patent Document 1: Japanese Unexamined Patent Application, Publication No. H01-126339
Patent Document 2: Japanese Unexamined Patent Application, Publication No. 2011-529404
Patent Document 3: Japanese Unexamined Patent Application, Publication No. 2000-351189
Patent Document 4: Japanese Unexamined Patent Application, Publication No. H03-203291
Patent Document 5: Japanese Unexamined Patent Application, Publication No. 2010-247206

DISCLOSURE OF THE INVENTION

Problems to be Solved by the Invention

Nonetheless, there is room for further improvement of the strength of the one molded article joined with another molded article. For example, according to the approach described in Patent Document 3, a composite molded article will have a surface layer material compression-formed on a base material having pits and protrusions on a surface of the molded article from which fibers protrude. Therefore, fibers are easily allowed to be stuck into the surface layer material, and at the same time, the surface layer material is easily allowed to be removed from the fibers. In order to prevent detachment of a surface layer material, a base material needs to be bonded with the surface layer material with an adhesive agent.

Further, the objective of Patent Document 4 is to provide a mutual conduction at an interface between molded members, and thus an inorganic filler bridged between the molded members will be sufficient. Patent Document 4 neither discloses nor suggests achievement of a high anchor effect.

Moreover, Patent Document 5 merely discloses that carbon fiber is exposed at a cut section when a carbon-fiber reinforced plastic material is cut with a conventional $CO_2$ laser or a fiber laser, but does not disclose that the above carbon fiber can contribute to the bonding strength between members.

The present invention is made to solve the above problems. The objective of the present invention is to provide a resin molded article capable of further enhancing the strength thereof when joined with another molded article.

Means for Solving the Problems

The present inventors have conducted extensive studies to achieve the above objectives. As a result, the present inventors find the followings: a groove can be formed by removing a portion of resin of a resin molded article containing fibrous inorganic fillers and also removing a portion of the fibrous inorganic fillers so that end portions of the fibrous inorganic fillers are protruded and exposed from a side surface of the groove at least in the surface side of the groove. According to the above approach, a deeper groove can be formed, and materials for forming another molded article can easily be introduced into the groove. Therefore, the fibrous inorganic fillers exposed at the groove can serve as anchors for preventing destruction of the grooved resin molded article and the other molded article at their joining region when the grooved resin molded article is joined with the other molded article, leading to a significantly enhanced strength of the resulting composite molded body. Specifically, the present invention provides the followings.

(1) The present invention provides a composite molded article comprising a grooved resin molded article and other materials, wherein the other materials are integrated with the grooved resin molded article on a surface having a groove of the grooved resin molded article, the groove having end portions of fibrous inorganic fillers protruded and exposed from a side surface of the groove toward the direction of a facing side surface at least in a surface side inside the groove.

(2) Further, the present invention provides the composite molded article according to (1), wherein exposure of the end portions of the fibrous inorganic fillers and formation of the groove are performed by laser irradiation.

(3) Further, the present invention provides the composite molded article according to (1) or (2), wherein the depth of the groove is 200 μm or more.

(4) Further, the present invention provides the composite molded article according to any one of (1) to (3), wherein the end portions of the fibrous inorganic fillers are protruded and exposed from both side surfaces of the groove at least in the surface side inside the groove.

(5) Further, the present invention provides the composite molded article according to (4), wherein the end portions of the fibrous inorganic fillers are protruded and exposed from the both side surfaces of the groove in a coaxially opposing manner.

(6) Further, the present invention provides the composite molded article according to any one of (1) to (5), wherein a molded article comprising the other materials is arranged so as to surround the fibrous inorganic fillers in the inside of the groove.

(7) Further, the present invention provides the composite molded article according to any one of (1) to (6), wherein the composite molded article is integrally produced by injection molding.

(8) Further, the present invention provides a method of manufacturing a composite molded article, the method comprising: a groove formation step of removing a portion of resin of a resin molded article containing fibrous inorganic fillers to form a groove having end portions of the fibrous inorganic fillers protruded and exposed from a side surface of the groove toward the direction of a facing side surface at least in a surface side inside the groove; a composite molding step of integrating other materials on a surface having the groove as a contact surface to manufacture the composite molded article.

(9) Further, the present invention provides the method of manufacturing a composite molded article according to (8), wherein the removal of the portion of the resin is performed by laser irradiation.

(10) Further, the present invention provides the method of manufacturing a composite molded article according to (9), wherein the laser irradiation is performed in a direction other than the direction perpendicular to a surface of a molded article.

(11) Further, the present invention provides the method of manufacturing a composite molded article according to any one of (8) to (10), wherein the removal of the portion of the resin is performed until the depth of the groove becomes 200 μm or more.

(12) Further, the present invention provides the method of manufacturing a composite molded article according to any one of (8) to (11), wherein the groove formation step comprises removing a portion of resin of the resin molded article to form a groove having end portions of the fibrous inorganic fillers protruded and exposed from both side surfaces of the groove in the directions of facing side surfaces at least in the surface side inside the groove.

(13) Further, the present invention provides the method of manufacturing a composite molded article according to any one of (8) to (12), wherein the groove formation step further comprises removing a portion of the fibrous inorganic fillers.

(14) Further, the present invention provides the method of manufacturing a composite molded article according to any one of (8) to (13), wherein the groove formation step comprises removing a portion of the fibrous inorganic fillers to allow the end portions of the fibrous inorganic fillers to be protruded and exposed from the both side surfaces of the groove in an opposing manner.

(15) Further, the present invention provides the method of manufacturing a composite molded article according to any one of (8) to (14), wherein the composite molding step comprises integrating other materials through a surface having the groove as a contact surface by injection molding to manufacture an injection-molded composite article.

Effects of the Invention

According to the present invention, fibrous inorganic fillers exposed at a groove can serve as anchors for preventing destruction of a grooved resin molded article and another molded article when the grooved resin molded article is joined with the other molded article, leading to a significantly enhanced strength of the resulting composite molded body.

PREFERRED MODE FOR CARRYING OUT THE INVENTION

Below, embodiments of the present invention will be described in detail, but the present invention shall not in any way be limited to the following embodiments. Modifications may be appropriately made within the scope of the objective of the present invention. Note that descriptions may appropriately be omitted for redundant parts, but this shall not limit the sprite of the present invention.

<Grooved Resin Molded Article 10>

Figure 1:
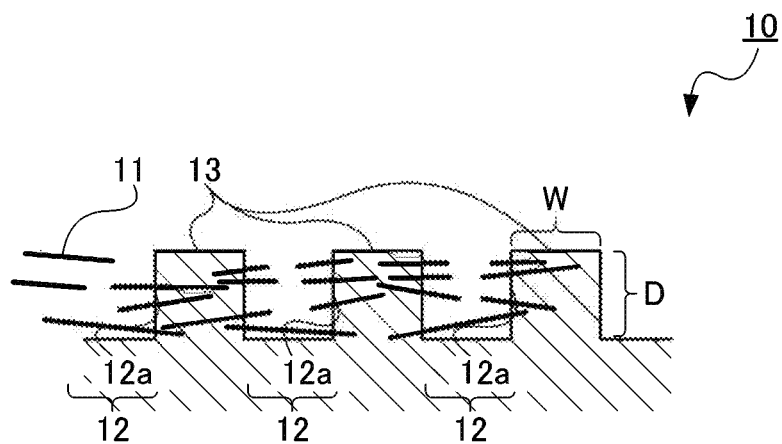
FIG. 1 shows a schematic view of a grooved resin molded article 10 which is a component of a composite molded article 1 according to the present invention in an enlarged schematic cross section.

FIG. 1 shows an enlarged schematic cross-sectional view of the grooved resin molded article 10 which is a component of the composite molded article 1 (FIG. 2) according to the present invention. The grooved resin molded article 10 contains a fibrous inorganic filler 11. Further, the grooved resin molded article 10 has a groove 12 with an end portion of the fibrous inorganic filler 11 protruded and exposed from a side surface toward the direction of a facing side surface at least in a surface side. The surface side means a side closer to the surface of a molded article in the depth direction of the groove.

[Resin]

There is no particular limitation for the type of a resin as long as it can be removed upon laser irradiation, resulting in formation of the groove 12. The resin can be any as long as it can be removed upon laser irradiation, and a portion of the fibrous inorganic fillers 11 can also be removed upon laser irradiation with an adjusted laser absorption so as to suitably expose an end portion of the fibrous inorganic filler 11 at least in the surface side of a groove formed in the grooved resin molded article 10.

Methods of adjusting a laser absorbance can include adjusting the type and amount of a laser-absorbing additive to be included in a resin. For such additives, those such as pigments and dyes may be used, and carbon black is effective.

The resin may be thermoplastic or thermosetting. Materials suitable for resin can include, for example, polyphenylene sulfide (PPS), liquid crystal polymer (LCP), polybutylene terephthalate (PBT), polyacetal (POM) and the like.

[Fibrous Inorganic Filler 11]

There is no particular limitation for the fibrous inorganic fillers 11 as long as a portion of the fibrous inorganic fillers 11 can be partly removed, and end portions of the fibrous inorganic fillers 11 can be protruded and exposed from a side surface of a groove formed on the grooved molded article 10 at least in the surface side of the groove when a portion of resin of a resin molded article is removed to form the groove 12.

Examples of the fibrous inorganic filler 11 can include glass fiber, carbon fiber, whisker fiber and the like. They can be used alone or in a combination thereof. As long as it is fibrous, detachment of the fibrous inorganic filler 11 from a composite molded article (1 in FIG. 2) can be prevented, and the fibrous inorganic filler 11 can serve as anchors for preventing separation of the resin molded article 10 and another molded article (20 in FIG. 2). Among these, glass fiber is suitably used for the present invention. Further, non-fibrous inorganic fillers such as glass flakes, mica, talc and glass beads; other additives and modifiers; and the like may be blended to an extent where the effects of the present invention are not impaired.

As described above, there is no particular limitation for the fibrous inorganic fillers 11 as long as end portions of the fibrous inorganic fillers 11 can be protruded and exposed from a side surface of a groove in the surface side of the groove toward the direction of a facing side surface. However, they are preferably protruded and exposed from both side surfaces of a groove at least in the surface side inside the groove, and more preferably protruded and exposed from the both side surfaces of the groove in a coaxially opposing manner. When the bonding strength is measured for the composite molded article 1 in which the grooved resin molded article 10 is integrated with another molded article (20 in FIG. 2), the composite molded article 1 is destructed via the mechanism of base-material destruction where the other molded article 20 breaks with a portion of the other molded article 20 remained in grooves instead of simple detachment. This suggests that in the composite molded article 1 where the grooved resin molded article 10 is integrated with another molded article (20 in FIG. 2), the fibrous inorganic fillers 11 can effectively engage with the other molded article 20 by virtue of being protruded and exposed from both side surfaces of a groove toward the directions of facing side surfaces, preventing removal of the other molded article 20 from the groove when a force is applied to peel the other molded article 20 away from the grooved resin molded article 10.

Preferably, in the deep region of the groove 12, the inorganic filler 11 appropriately bridges protrusions 13 of the pits and protrusions formed by removing a portion of resin in a case where the inorganic filler 11 exposed at the groove 12 serves as anchors for preventing destruction of the resin molded article 10 and the other molded article 20.

There is no particular limitation for the content of the fibrous inorganic fillers 11, but it is preferably from 5 parts by weight to 80 parts by weight relative to 100 parts by weight of the resin. When the content is less than 5 parts by weight, the fibrous inorganic fillers 11 may not be able to fully serve as anchors for preventing destruction of the grooved resin molded article 10 and the other molded article 20 even in a case where the fibrous inorganic fillers 11 are exposed at the groove 12. A content of more than 80 parts by weight is not preferred because the anchor effect between the fibrous inorganic fillers 11 and another molded article arranged in the groove may not be fully achieved.

[Commercially Available Products Suitable for Resin Materials Containing Fibrous Inorganic Fillers 11]

Commercially available products of resin materials containing the inorganic fillers 11 can include PPS with glass fiber (Product name: Durafide PPS 1140A1, Polyplastics Co., Ltd.), PPS with glass fiber (Product name: Durafide PPS 1140A7, Polyplastics Co., Ltd), PPS with glass fiber/inorganic filler (Product name: Durafide PPS 6165A7, Polyplastics Co., Ltd), LCP with glass fiber (Product name: Vectra LCP E130i, Polyplastics Co., Ltd.) and the like.

[Groove 12]

The groove 12 is formed on a surface of the resin molded article 10. The fibrous inorganic fillers 11 are exposed at the groove 12. A portion of the resin can be removed to form the groove 12, and a portion of the fibrous inorganic fillers exposed from a side surface at least in the surface side of the groove and partly shielding a laser irradiated on the groove can also be removed to expose end portions of the fibrous inorganic fillers 11 from the side surface 12a of the groove 12 such that the end portions of the fibrous inorganic fillers 11 are protruded from the side surface of the groove. The laser shielding effect due to the fibrous inorganic fillers 11 exposed at the groove 12 may be attenuated by removing at least a portion of the fibrous inorganic fillers 11. As a result, a laser can effectively irradiate the deep region of the groove to allow for formation of a deeper grove. This can enhance the anchor effect when composite molding with another molded article is performed. Further, when obtaining a composite molded article in which another molded article is integrated, a portion of fibrous fillers is removed such that end portions of exposed fibrous fillers are protruded at least in the surface side, and in particular, fibrous inorganic fillers at the central region of the groove are removed. This can facilitate entering of a fluidized another molded article into the groove. Therefore, a high anchor effect can be obtained even in a case where the groove is deep.

Meantime, the fibrous inorganic fillers 11 are not exposed from the composite molded article 1 after the grooved resin molded article 10 is integrated with the other molded article (20 in FIG. 2) through a surface having the groove 12 of the grooved resin molded article 10 as a contact surface to manufacture the composite molded article (1 in FIG. 2) according to the present invention. As used herein, even in a case where the fibrous inorganic fillers 11 are not exposed from the composite molded article 1, "the fibrous inorganic fillers 11 are considered to be exposed at the multiple grooves 12", if the fibrous inorganic fillers 11 are exposed from the grooves 12 when the other molded article 20 is removed from the composite molded article 1.

The longer direction of the groove 12 is preferably different from those of the fibrous inorganic fillers 11 because a sufficient anchor effect can be obtained more effectively by virtue of end portions of the inorganic fillers protruded and exposed from a side surface of the groove when composite molding with another resin molded article is performed.

When the multiple grooves 12 are formed on a surface of the resin molded article 10, the anchor effect may be further enhanced. In a case where the multiple grooves 12 are formed, these multiple grooves 12 may be such that each groove is individually formed, or such that a groove comprising multiple pits and projections is drawn in one stroke at a time.

The multiple grooves 12 may be provided such that the grooves 12 each connected at the both ends are aligned like a contour line, or may be formed in a stripe-like pattern where the grooves 12 are not crossed, or may be formed in a grid-like pattern where the grooves 12 are crossed. In a case where the grooves 12 are formed in a grid-like pattern, a diagonal grid is preferably formed such that the longer direction of the groove 12 is different from those of fibrous inorganic fillers. Further, in a case where the grooves 12 are formed in a grid-like pattern, the grooves 12 may be formed in a rhomboidal pattern.

There is no particular limitation for the length of the groove 12, and the shape of an opening may be rectangular, or may be circular or elliptical when the groove 12 is short. The groove 12 is preferably long in order to obtain the anchor effect.

Further, there is also no particular limitation for the depth D of the groove 12, but it is preferably deeper because a higher anchor effect can be obtained. A laser which irradiates the groove is less shielded when a portion of the fibrous inorganic fillers exposed at the groove are removed, allowing for easy formation of a deeper groove. According to the present invention, a groove having a depth of 200 μm or more can even be formed. In a case where the depth D is small, the grooved resin molded article 10 may not be tightly joined with the other molded article 20 since a sufficient anchor effect may not be obtained between the fibrous inorganic fillers 11 exposed at the groove 12 and the other molded article 20 when the other molded article 20 is joined through the groove 12 to form the composite molded article 1.

<Method of Manufacturing Grooved Resin Molded Article 10>

The grooved resin molded article 10 can be obtained by irradiating a resin molded article containing the fibrous inorganic fillers 11 with a laser to remove a portion of the resin, thereby forming the groove 12 where end portions of the fibrous inorganic fillers 11 are protruded and exposed from a side surface at least in the surface side.

Laser irradiation is set up based on the type of a target material for irradiation, the output of a laser device and the like.

Further, there is no particular limitation for the conditions of laser irradiation as long as a portion of the resin can be removed. Preferably laser irradiation is performed in a direction other than the direction perpendicular to the surface of the molded article to remove a portion of the resin as well as a portion of the fibrous inorganic fillers. Removal of both a portion of the resin and a portion of the fibrous inorganic fillers allows end portions of the fibrous inorganic fillers to be protruded and exposed from both side surfaces of a groove in the surface side of the groove toward opposing side surfaces, more specifically, to be protruded and exposed from the both side surfaces of the groove in a coaxially opposing manner.

<Composite Molded Article 1>

Figure 2:
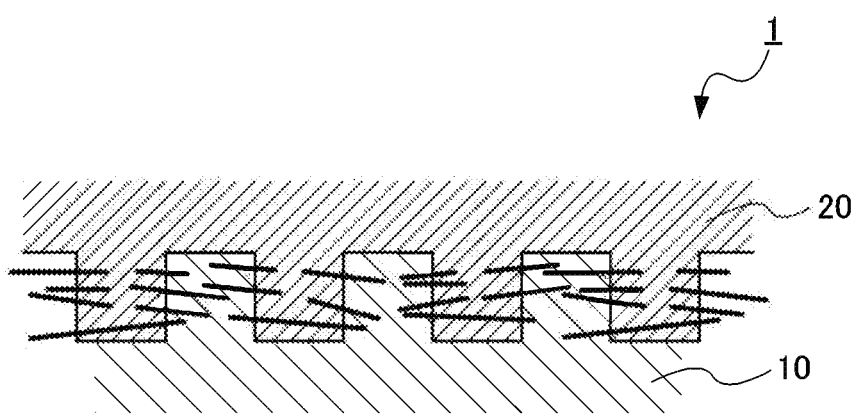
FIG. 2 shows a schematic view of a composite molded article 1 according to the present invention in an enlarged schematic cross section.

FIG. 2 shows a schematic view of the composite resin molded article 1 according to the present invention in an enlarged schematic cross section. In the composite molded article 1, the other molded article 20 is adjoined on a surface having the groove 12 of the grooved resin molded article 10. There is no particular limitation for the aspect of the other molded article 20 inside the groove 12, but the other molded article 20 is preferably arranged to surround the fibrous inorganic fillers 11 in the inside of the groove 12 in order to obtain a high anchor effect.

[Another Molded Article 20]

There is no particular limitation for the other molded article 20 as long as the other molded article 20 in an uncured state can enter the groove 12 where the fibrous inorganic fillers 11 are exposed. It may be any of the followings: a thermoplastic resin, a curable resin (a thermo-setting resin, a photo-curable resin, a radiation curable resin and the like), rubber, an adhesive, a metal and the like.

<Method of Manufacturing Composite Molded Article 1>

The composite molded article 1 can be obtained by not only performing multiple molding but also heat-melting resin molded articles such as ultrasonic welding, laser welding and high-frequency induction heating welding.

Conventionally, combinations of mutually heat-weldable materials are very limited even if a first welding-scheduled surface of a primary molded article and a second welding-scheduled surface of a secondary molded article are both heat-melted when the resin molded articles are heat-welded together. However, according to the present invention described herein, heat-melting of the second welding-scheduled surface alone is sufficient, and the combination of the materials may not necessarily be mutually heat-weldable. The invention described herein merely requires that the other resin molded article 20 is press-contacted against a first welding-scheduled surface on which the groove 12 is pre-formed. Therefore, any combinations of materials for resin molded articles can be used, and the composite molded article 1 excellent in both dimensional precision and bonding strength can be obtained.

[Multiple Molding]

Figure 3:
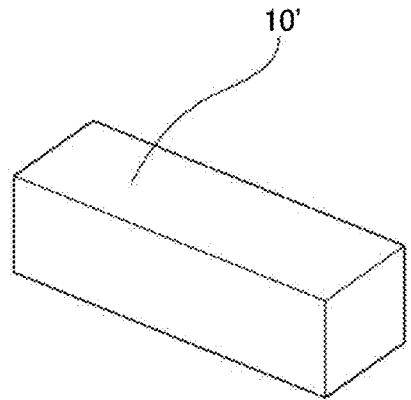
FIG. 3 schematically illustrates how the composite molded article 1 is obtained by multiple molding.
Figure 3:
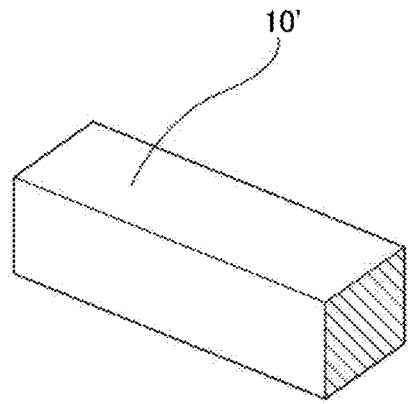
Figure 3:
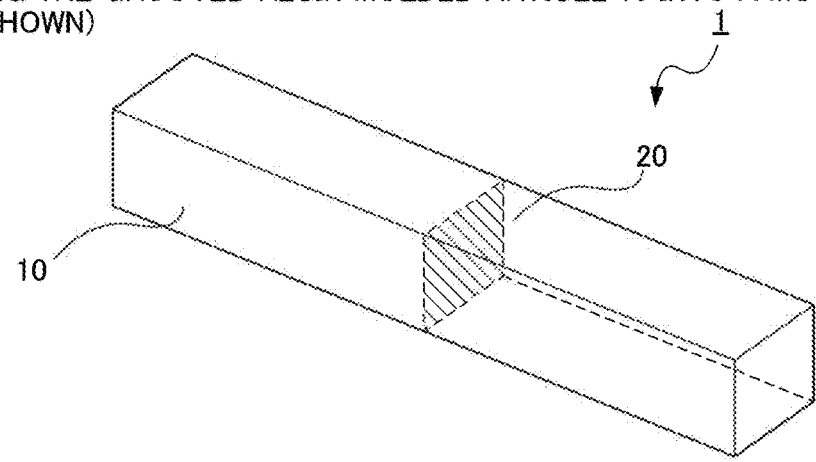

FIG. 3 schematically illustrates how the composite molded article 1 is obtained by multiple molding. First, as shown in (1) of FIG. 3, primary molding of a primary resin is performed to prepare a grooved resin molded article preliminary body 10'. Then, as shown in (2) of FIG. 3, partial resin removal is performed on at least a portion of a surface of the preliminary body 10' to form the groove 12. Thereby, the grooved resin molded article 10 is produced.

Subsequently, as shown in (3) of FIG. 3, the grooved resin molded article 10 is placed into a mold (not shown), and then a secondary resin (an uncured material of the other molded article 20) is charged into the above mold through a surface having the groove 12 arranged as a contact surface, and then the material is cured. The composite molded article 1 with a curable resin can be obtained by multiple molding via the above step. Further, similarly, the composite molded article 1 with a thermoplastic resin can be obtained by multiple molding when a heat-melted thermoplastic resin is used as the secondary resin. There is no particular limitation for the type of a mold. It is, however, preferred that the grooved resin molded article 10 is placed in a mold for injection molding such that a surface having a groove formed by laser irradiation is arranged as a contact surface, and then integrated with another molded article by injection-molding a material for the other molded article 20 to obtain a composite molded article. In the injection molding, the other molded article 20 in an uncured state is injected under high pressure into a mold having the grooved resin molded article 10 inside, allowing the uncured material to effectively enter the groove 12 where the fibrous inorganic fillers 11 are exposed. In this way, an integrated composite molded article can be easily obtained.

The grooved molded article 10 has a groove 11, and the other molded article 20 does not have a groove in the following Examples, but the configuration shall not be limited to this. For example, the other molded article 20 may also have a groove. Then, the grooved molded article 10 may be placed at one side of a mold, and the other molded article 20 may be placed at the other side, and then an adhesive composition may be charged between the grooved molded article 10 and the other molded article 20 so that the adhesive composition is allowed to enter the groove 11 of the grooved molded article 10 and the groove of the other molded article 20. This can allow the grooved molded article 10 to be firmly joined with the other molded article 20 regardless of the type of the adhesive composition and even in a case where the adhesive composition is not perfectly suitable for interlayer adhesion between the grooved molded article 10 and the other molded article 20.

EXAMPLES

Below, the present invention will be described in more detail with reference to preliminary test examples and Examples, but the present invention shall not be limited to these.
(Conditions for Injection Molding of Durafide)
  Pre-drying: 140° C., 3 hours
  Cylinder temperature: 320° C.
  Mold temperature: 140° C.
  Injection velocity: 20 mm/sec
  Pressure holding: 50 MPa (500 kg/cm$^2$)
(Conditions for Injection Molding of Duracon)
  Pre-drying: 80° C., 3 hours
  Cylinder temperature: 190° C.
  Mold temperature: 80° C.
  Injection velocity: 16 mm/sec
  Pressure holding: 80 MPa (800 kg/cm$^2$)

<Example 1> Partial Removal of Glass Fiber (Comparison of Irradiation Angles)

Formation of a groove in which a portion of fibrous inorganic fillers are removed on the surface of a groove can be performed according to the following method.

TABLE 1

| | | Formation of grooves Laser irradiation | | |
| --- | --- | --- | --- | --- |
| | Resin molded article Resin material | Angle | Number of times | Direction |
| Reference Example 1 | PPS with glass fiber 1140 A1 | 90 degrees | 10 times | Striped |
| Example 1 | CB0.2% | 60 degrees | | |

[Manufacture of Grooved Resin Molded Articles]

Figure 4:
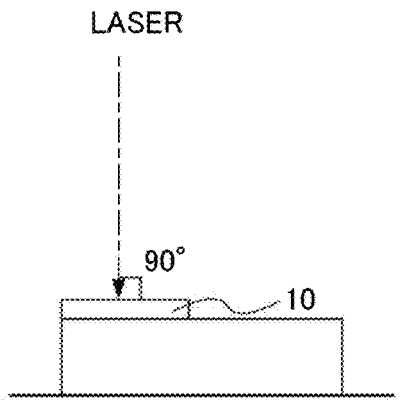
FIG. 4 illustrates the irradiation angles in Example 1 (comparison of irradiation angles of laser).
Figure 4:
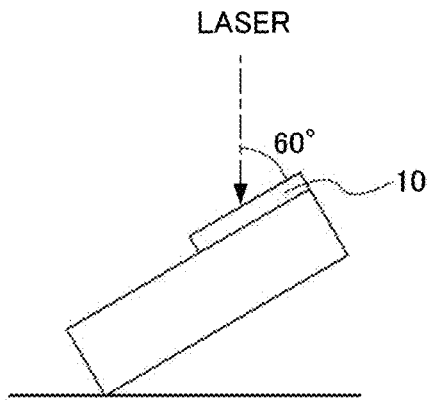

An injection-molded article was obtained by injection-molding PPS with glass fiber (Product name: Durafide PPS 1140A1, Polyplastics Co., Ltd.) under the conditions as shown above (the conditions for injection molding). Then, the injection-molded article was irradiated with a laser beam with a spot diameter of 50 μm. Irradiation was repeated 30 times in total: 3 sets of 10 irradiations with a shift of 25 μm after each set to irradiate a width of 100 μm. Laser irradiation was performed in two different ways. In one case, irradiation was performed in the direction perpendicular to the surface of an injection-molded article as shown in FIG. 4 (1). In the other case, irradiation was performed in the direction of 60 degrees relative to the surface of an injection-molded article after tilting the injection-molded article by 30 degrees from the horizontal direction as shown in FIG. 4 (2). The laser oscillation wavelength was 1.064 μm, and the maximum rating power was set to 13 W (average). The power, frequency and scanning rate were 90%, 40 kHz and 1000 mm/s, respectively. In this way, the grooved resin molded articles according to Examples and Reference Examples were obtained.

[Evaluation]

Figure 5:
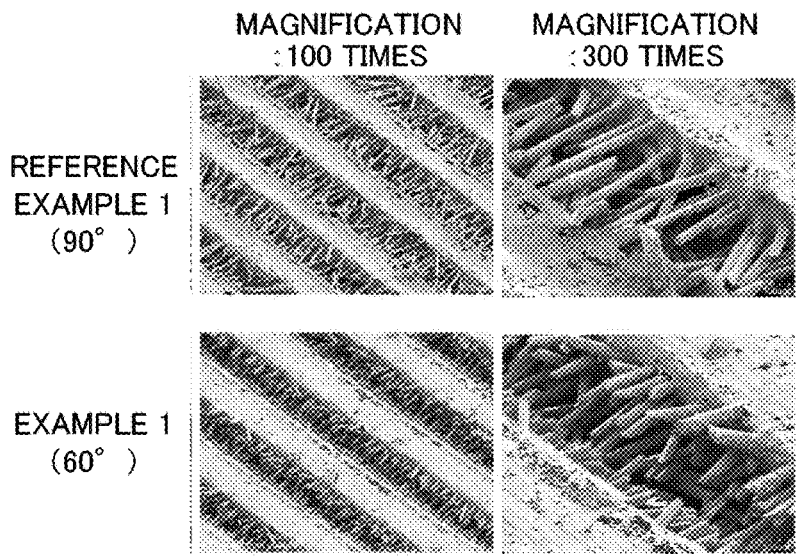
FIG. 5 shows SEM images of the grooved resin molded articles according to Example 1 (comparison of irradiation angles of laser).

A surface having a groove was observed in an enlarged view under an electron microscope (SEM). Two magnifications: 100 times and 300 times were used. Results are shown in FIG. 5 and Table 2.

TABLE 2

| | Observation under magnification |
| --- | --- |
| Reference Example 1 | Fibrous inorganic fillers are protruded and exposed from side surfaces of grooves to cover the grooves. |
| Example 1 | End portions of fibrous inorganic fillers protrude from side surfaces of grooves at least in the surface sides. Fibrous inorganic fillers near the centers of grooves are selectively removed at the exposed surface sides, and observation of deeper regions of the grooves is possible. |

The grooved resin molded article according to Example 1 was prepared by removing a portion of fibrous inorganic fillers when a portion of resin was removed by laser irradiation. The results showed that end portions of the fibrous inorganic fillers were protruded and exposed from surface sides of the grooves at least in the surface sides. The results also showed that deeper grooves were able to be obtained as compared with those from a preliminary test, leading to a high anchor effect.

In particular, the results demonstrated that a portion of the fibrous inorganic fillers were able to be removed easily when performing laser irritation in the direction perpendicular to the surface of a molded article, allowing a deeper groove to be obtained easily (FIG. 5, Example 1).

<Example 2> Partial Removal of Glass Fiber (Comparison of Resin Materials)

Subsequently, various resin materials were studied to determine if they are suitable for use in the present invention.

TABLE 3

| | Resin molded article Resin material | Formation of grooves Width of groove | Distance between grooves | Laser irradiation Angle | Number of times | Direction | Another molded article Material |
|---|---|---|---|---|---|---|---|
| Comparative Example | PPS with glass fiber 1140 A1 CB0.2% | No groove | — | — | — | — | PPS with glass fiber |
| Reference Example 2 | PPS with glass fiber 1140 A1 CB0.2% | 100 μm | 200 μm | 90 degrees | 10 times | Diagonal grid | PPS with glass fiber |
| Example 2 | PPS with glass fiber 1140 A1 CB0.01% | | | | | | |
| Example 3 | PPS with glass fiber 1140 A1 CB0.01% | | | | 30 times | | POM |

In Table 3, resin materials used in the resin molded articles are as follows.

PPS with glass fiber 1140 A1 CB 0.2%: Durafide PPS 1140A1, carbon black 0.2%, Polyplastics Co., Ltd.)

PPS with glass fiber 1140 A1 CB 0.01%: Durafide PPS 1140A1 carbon black 0.01%, Polyplastics Co., Ltd.)

POM: Duracon POM M450-44, Polyplastics Co., Ltd.

[Manufacture of Grooved Resin Molded Articles]

An injection-molded article was obtained by injection-molding a resin material shown in Table 3 under the conditions as shown above (the conditions for injection molding). Then, the injection-molded article was irradiated in the direction perpendicular to the surface of the injection-molded article in a diagonal lattice pattern such that the number of irradiation was 10 as in Example 1. The laser oscillation wavelength was 1.064 μm, and the maximum rating power was set to 13 W (average). The power, frequency and scanning rate were 90%, 40 kHz and 1000 mm/s, respectively. In this way, grooved resin molded articles according to Examples and Reference Example were obtained which had grid-like grooves each with a width of 100 μm.

[Manufacture of Composite Molded Articles]

Each of the grooved resin molded article according to Examples, Reference Example and Comparative Example was placed in a corresponding mold for injection-molding such that a surface having a groove formed by laser irritation was arranged as a contact surface. Then a material for another molded article as shown in Table 1 was injection molded under the conditions described above to obtain a composite molded article.

[Evaluation]

[Observation of Grooved Resin Molded Articles Under Magnification]

The grooved resin molded articles were each observed for a surface having a groove in an enlarged view under an electron microscope (SEM). Three magnifications: 100 times and 300 times were used.

[Depth of Groove]

For each grooved resin molded article, the depth of a groove was measured in a cross-sectional view.

[Strength]

Figure 6:
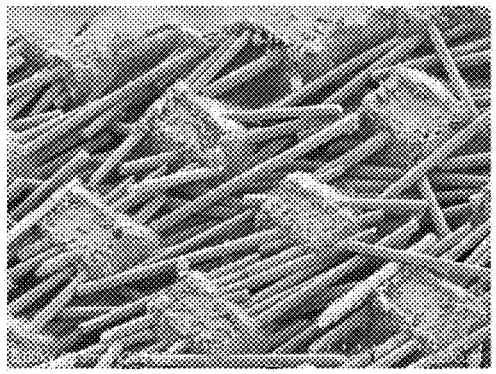
FIG. 6 shows SEM images of the grooved resin molded articles according to Example 2 (comparison of resin materials).
Figure 6:
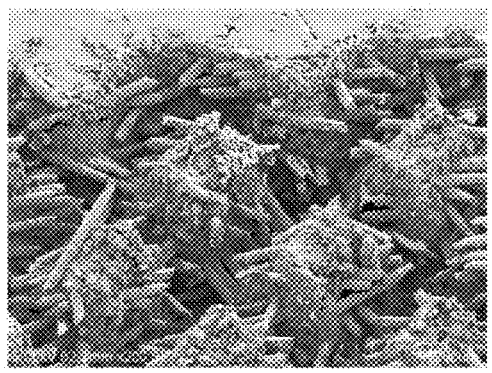
Figure 6:
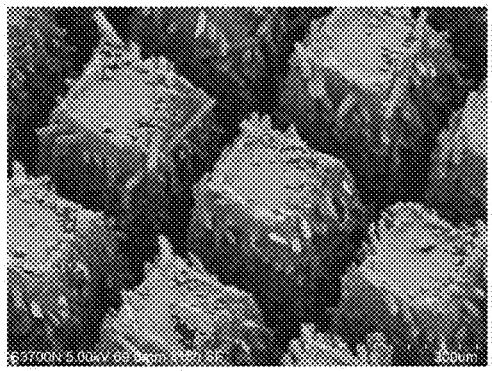

The failure load was measured for each of the composite molded articles to determine the bonding strength. Measurements of the failure load were performed as follows. A Tensilon UTA-50kN (Orientec Corporation) was used as a measurement instrument. A composite molded body (a length of 120 mm, a width of 12 mm, a thickness of 6 mm) was peeled away under a condition of a crosshead speed of 1 mm/min. Results are shown in FIG. 6 and Table 4. For Comparative Example, the measurement of the strength was not possible because it was destroyed by a weak force.

TABLE 4

| | Observation under magnification | Depth of groove | Strength (Failure load) |
|---|---|---|---|
| Reference Example 2 | End portions of fibrous inorganic fillers are protruded and exposed from side surfaces of grooves at least in the surface sides. | 170 μm | 5226N |
| Example 2 | End portions of fibrous inorganic fillers are protruded and exposed from side surfaces of grooves at least in the surface sides. Fibrous inorganic fillers near the centers of grooves are selectively removed at the surface sides. Observation of deeper regions of the grooves is possible. | 220 μm | 5469N |
| Example 3 | End portions of fibrous inorganic fillers are protruded and exposed from side surfaces of grooves at least in the surface sides. Fibrous inorganic fillers near the centers of grooves are selectively removed at the surface sides. Observation of deeper regions of the grooves is possible. | 480 μm | 2954N |

The grooved resin molded articles according to Examples 2 and 3 were prepared by removing a portion of fibrous inorganic fillers when a portion of resin was removed by laser irradiation. The results showed that end portions of fibrous inorganic fillers were protruded and exposed from the surface sides of the grooves at least in the surface sides. The results also showed that a deeper groove was able to be easily obtained, and thus a higher anchor effect was able to be obtained as compare when a portion of fibrous inorganic fillers were not removed.

Instead of simple detachment, the composite molded article 1 was destroyed upon measurement of the bonding strength by the mechanism of base-material destruction in which another molded article was destroyed with a portion of the other molded article remained in a groove. This appears to be because end portions of fibrous inorganic fillers are protruded and exposed from both side surfaces of a groove at the surface side of the groove toward the direction of the facing side surfaces. Therefore, these results suggest that in a composite molded article where a grooved resin molded article is integrated with another molded article, fibrous inorganic fillers can effectively engage with the other molded article, preventing removal of the other molded article 20 from a groove when a force is applied to peel the other molded article away from the grooved resin molded article.

In particular, it was demonstrated that a portion of fibrous inorganic fillers were able to be effectively removed when a resin for forming a grooved resin molded article comprised carbon black in such an amount so as to adjust a laser absorbance (FIG. 6, Example 2-2). Consequently, a deeper groove was able to be formed easily, and the inside of the groove was also able to be easily filled with another resin even at a deeper region. Therefore, a much higher anchor effect was able to be obtained.

EXPLANATION OF REFERENCE NUMERALS

1 Composite molded article
10 Grooved resin molded article
11 Fibrous inorganic filler
12 Groove
12a Side surface of groove
13 Protrusions
20 Another molded article

The invention claimed is:

1. A method of manufacturing a composite molded article, the method comprising: a groove formation step of removing a portion of resin of a resin molded article containing fibrous inorganic fillers and a portion of the fibrous inorganic fillers by irradiating the resin molded article with a laser beam to form a groove having end portions of the fibrous inorganic fillers protruded and exposed from a side surface of the groove toward the direction of a facing side surface at least in a surface side inside the groove; and a composite molding step of integrating other materials on a surface having the groove as a contact surface to manufacture the composite molded article.

2. The method of manufacturing a composite molded article according to claim 1, wherein the laser irradiation is performed in a direction other than the direction perpendicular to a surface of a molded article.

3. The method of manufacturing a composite molded article according to claim 1, wherein the removal of the portion of the resin is performed until the depth of the groove becomes 200 µm or more.

4. The method of manufacturing a composite molded article according to claim 1, wherein the groove formation step comprises removing a portion of the fibrous inorganic fillers to allow the end portions of the fibrous inorganic fillers to be protruded and exposed from the both side surfaces of the groove in a coaxially opposing manner.

5. The method of manufacturing a composite molded article according to claim 1, wherein the composite molding step comprises integrating the other materials through a surface having the groove as a contact surface by injection molding to manufacture an injection-molded composite article.

* * * * *